United States Patent
Lee et al.

(10) Patent No.: US 12,041,017 B2
(45) Date of Patent: Jul. 16, 2024

(54) METHOD FOR PROVIDING SUBSCRIPTION SERVICE, SYSTEM, USER DEVICE, AND APPLICATION IMPLEMENTING THE METHOD

(71) Applicant: KAKAO CORP., Jeju-si (KR)

(72) Inventors: Seunghyung Lee, Seongnam-si (KR); Dasul Oh, Seongnam-si (KR); Eunju Oh, Seongnam-si (KR); Samki Lee, Seongnam-si (KR); Soo Yeun Jang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/815,625

(22) Filed: Jul. 28, 2022

(65) Prior Publication Data
US 2023/0034232 A1     Feb. 2, 2023

(30) Foreign Application Priority Data
Jul. 30, 2021   (KR) .......................... 10-2021-0100720

(51) Int. Cl.
*H04L 51/04*   (2022.01)
*G06F 3/04842*   (2022.01)

(52) U.S. Cl.
CPC .......... *H04L 51/04* (2013.01); *G06F 3/04842* (2013.01)

(58) Field of Classification Search
CPC .............................. H04L 51/04; G06F 3/04842
USPC ........................................................ 709/206
See application file for complete search history.

(56) References Cited

U.S. PATENT DOCUMENTS

| 10,769,678 | B2 | 9/2020 | Li |
| 11,074,603 | B1* | 7/2021 | Smith ............... G06Q 30/0607 |
| 11,321,729 | B1* | 5/2022 | Hayes ............... G06Q 30/0222 |
| 2009/0259535 | A1* | 10/2009 | Chow ............... G06Q 30/0207 |
| | | | 705/14.1 |
| 2016/0337291 | A1* | 11/2016 | Park ..................... H04L 51/214 |
| 2016/0360287 | A1* | 12/2016 | Van .................. H04N 21/44204 |
| 2018/0054378 | A1 | 2/2018 | Bastide et al. |

(Continued)

FOREIGN PATENT DOCUMENTS

| JP | 2003-233556 | 8/2003 |
| JP | 2017-041239 | 2/2017 |

(Continued)

OTHER PUBLICATIONS

Young-ah Lee, The 'content subscription' war has reached full-scale . . . Naver-kakao head-to-head confrontation, a news article retrieved from https://www.techm.kr/news/articleView.html?idxno=84965, Jun. 17, 2021 (Year: 2021).*

*Primary Examiner* — Nicholas R Taylor
*Assistant Examiner* — Chong G Kim
(74) *Attorney, Agent, or Firm* — LEX IP MEISTER, PLLC

(57) ABSTRACT

A method for providing a subscription service in a terminal installed with an application by interworking with an application server is provided. The method comprises displaying a board provided by the application server on an interface screen, and changing an action button in which a function set on the board is implemented according to a passage of time or a selection of a user and displaying the action button. The board comprises a board title, a plurality of contents, and the action button, and is exposed along with a name of a channel having published the board.

8 Claims, 16 Drawing Sheets

(56) References Cited

U.S. PATENT DOCUMENTS

2019/0149768 A1\* 5/2019 McArdle ................ H04N 7/152
            348/14.09
2021/0194835 A1\* 6/2021 Kim ...................... H04L 65/403

FOREIGN PATENT DOCUMENTS

| JP | 2018-506793 | 3/2018 |
| JP | 2018-524717 | 8/2018 |
| JP | 2020-087467 | 6/2020 |
| JP | 2021-096860 | 6/2021 |
| KR | 10-0961437 | 6/2010 |
| KR | 10-1501341 | 3/2015 |
| KR | 10-1538181 | 7/2015 |
| KR | 10-1712570 | 3/2017 |
| KR | 20190030789 | 3/2019 |
| KR | 10-1967696 | 4/2019 |
| WO | 2017-094074 | 6/2017 |
| WO | 2021-019777 | 2/2021 |

\* cited by examiner

Board publication　　　　　　　　　　　　　　　　　　　　X

Disclosure settings　⦿ Disclosed　　○ Closed

Publication time　　⦿ Present　　　○ Scheduled

Category (optional)　(#Real-time news) (#Health) (#Economy) (#Brand) (#Career) (#Hobby) (#Knowledge culture) (#Essay) (#Sports) (#Culture/Arts) (#Fashion/Beauty) (#Living) (#Food) (#Entertainment) (#IT/TECH) (#Animal/Plant) (#Esthetic) (#Brand) (#Child care) (#Travel) (#Lecture) (#Product review) (#Living information) (#Shopping) (#Issue and attention) (#Content curator) (#Good influence) (#Life story)

⊘ Expose reward notification message on board.

☐ Publish

FIG. 8

9:41
Add talk calendar  ✕

New addition | Add existing open chat

You can register a schedule to do with subscribers.

Schedule name *

Date and time *

Start of schedule    2021.4.29.Thur. 2 p.m.
End of schedule     2021.4.29.Thur. 3 p.m.

Schedule change

Participation link

Place

Send notification
Two notifications are sent to users having registered to receive notification, 24hrs before schedule starts and at the start time.

Add talk calendar

Ebook of The Pleasures and Sorrows of Work' release | 5 days left | Receive notification Ebook of The Pleasures and Sorrows of Work' release | In progress | View schedule Simple schedule Ebook of The Pleasures and Sorrows of Work' release | In progress | Join When participation link is input

METHOD FOR PROVIDING SUBSCRIPTION SERVICE, SYSTEM, USER DEVICE, AND APPLICATION IMPLEMENTING THE METHOD

CROSS-REFERENCE TO RELATED APPLICATION

This application claims priority to and the benefit of Korean Patent Application No. 10-2021-0100720 filed in the Korean Intellectual Property Office on Jul. 30, 2021, the entire contents of which are incorporated herein by reference.

BACKGROUND (a) Field

The present disclosure is related to a content subscription.

(b) Description of the Related Art

Recently, subscription services have been launched in various fields. Particularly, content services, such as an OTT service, a music streaming service, a webtoon service, and a digital book service, are recognized as representative fields of a subscription economy.

Conventionally, the contents were consumed in a way that a content provider recommends customized contents to a user by analyzing user interests, and then the user consumes the recommended contents. Recently, the manner of content consumption has been changed in a way that the user subscribes to contents corresponding to one's interests and consumes the subscribed contents. To meet such a change in content consumption, a new subscription platform that can provide convenience in creating and publishing a content and can facilitate a subscription is required.

SUMMARY

An embodiment provides a method for providing a subscription service, and to provide a subscription system, a user terminal and an application implementing the same.

An embodiment is related to a method for providing a subscription service that supports publishing a board composed of contents curated by a creator and subscribing to a channel where the board is published.

An embodiment provides an editor that enables a creator to load, into a board being a content distribution unit, a created content and a content generated by curating collected contents, and enables to publish and manage the board.

An embodiment provides an interface screen that can expose a board published in a channel, recommend a board, or support subscription to a channel where a board is published.

An embodiment is related to a method for setting a function supporting interactions between creators and users, for publishing a board including the function, and for providing the function included in the board.

According to an embodiment, a method for providing a subscription service by a terminal installed with an instant messaging application, through interworking with an application server is provided. The method includes displaying a board provided by the application server on an interface screen, changing an action button in which a function set on the board is implemented according to a passage of time or a selection of a user and displaying the action button. The board includes a board title, a plurality of contents, and the action button, and is exposed along with a name of a channel having published the board. The channel publishing each board is an account that has subscribed to a service providing the instant messaging application.

The function set on the board may include at least one of an open chat function, a schedule-related calendar function, a purchase function, and a sponsorship function.

Changing and displaying the action button may include, when the function set on the board is an open chat function activated at a scheduled time point, changing from an action button of receiving a notification that is available for receiving a notification of the open chat, to an action button of open chat that is available for entering an open chat room, over time.

Changing the action button and displaying the changed action button may include displaying a board in which an interaction area including the action button is deleted after the open chat is terminated.

Changing the action button and displaying the changed action button may include, when the function set on the board is a schedule-related calendar function starting at a scheduled time point, changing from an action button of receiving a notification that is available for receiving a notification of the schedule, to an action button corresponding to a state after starting the schedule, over time. The action button corresponding to the state after starting the schedule may include an action button for viewing a schedule, an action button for joining with a participation link set on the function, or an action button of an open chat that is available for entering an open chat room set for the function.

Changing the action button and displaying the changed action button may include changing the action button of receiving a notification as being in receiving the notification, when a user selects the action button of receiving a notification that enables to receive a notification of the function set on the board.

The method may further include receiving a request for receiving a notification about the function of the board through a selection of the action button of receiving a notification, and receiving a notification message related to the function from the application server.

According to another embodiment, a method for providing a subscription service by a terminal installed with an instant messaging application, through interworking with an application server is provided. The method includes displaying a board recommended by the application server on an interface screen, receiving a request for subscribing to a channel that has published the recommended board, from the user, requesting to the application server for registering the channel as a subscription channel, and displaying a recent board published in the subscription channel from the application server in a slot of the subscription channel. The recent board includes a plurality of contents and an action button in which a function set on the recent board, and is exposed along with a name of the channel that has published the board. The subscription channel is an account having subscribed to a service providing the instant messaging application.

Receiving the request for subscribing to the channel may include receiving an input of adding a friend for the channel.

The method may further include changing an action button in which the function set on the recent board according to a passage of time or a selection of a user, and displaying the action button.

Changing the action button and displaying the changed action button may include, when the function set on the recent board is an open chat function activated at a scheduled time point, changing from an action button of receiving a notification that is available for receiving a notification of an open chat, to an action button of the open chat that is available for entering an open chat room, over time.

Changing the action button and displaying the changed action button may include, when the function set on the recent board is a schedule-related calendar function starting at a scheduled time point, changing from an action button of receiving a notification that is available for receiving a notification of the schedule, to an action button corresponding to a state after starting the schedule, over time. The action button corresponding to the state after starting the schedule may include an action button for viewing a schedule, an action button for joining with a participation link set on the function, or an action button of an open chat that is available for entering an open chat room set for the function.

The method may further includes checking a specific function being provided through recent boards in channels, and displaying a function state window that groups notification information for the specific function and provides the grouped notification information.

The method may further include, when the function state window is selected, displaying channels providing the specific function by expanding the function state window.

According to still another embodiment, a method for publishing a board interworking with a creator center server by a terminal is provided. The method includes displaying an editor screen of a creation channel provided by the creator center server, displaying at least one function settable for the board on the editor screen, and receiving function setting information from a setting screen of a selected function, adding a content from at least one content source as a curated content of the board on the editor screen, and requesting the creator center server to publish a board, including the function set for the board and curated contents.

The function settable for the board may include at least one of an open chat function, a schedule-related calendar function, a purchase function, and a sponsorship function.

Receiving the function setting information may include receiving a chat room name related to an open chat and an activation time point of the open chat, when the selected function is the open chat function.

Receiving the function setting information may include receiving a schedule name and a start time point of a schedule, when the selected function is the schedule-related calendar function.

Receiving the function setting information may include further receiving a participation link or a place, when the selected function is the schedule-related calendar function.

The function set for the board may be provided through an action button implemented in a certain area of the published board.

According to an embodiment, any user who has a channel in an application can become a creator. Further, through boards curated with various perspectives of creators, an activation of subscription, a continuous maintenance of subscription, and an increase in content consumption can be expected.

According to an embodiment, through an editor provided by a creator center server, a creator can interwork with various content sources, can load a board being a content distribution unit by curating contents fetched from the interworking service and contents fetched by inputting an address link, and can publish the board to expose the board to a subscriber/potential subscriber.

According to an embodiment, a user can search for recommendation boards, and can search for recently published boards in a subscription channel added as a friend.

According to an embodiment, it is possible to expose contents as a board unit consisting of contents grouped by one topic (board title), and to enable a content curated by a creator to be completely consumed.

According to an embodiment, by providing interactions between creators and users via a board including functions, it can be deviated from providing a content unilaterally and interests can be continuously shared even after content consumption.

According to an embodiment, a board can be utilized as a micro-platform for various purposes based on a function set by a creator.

BRIEF DESCRIPTION OF THE DRAWINGS

FIG. 5 to FIG. 7 are examples of an editor screen displayed on a creator terminal.

FIG. 8 is an example of a screen for setting an open chat function on a creator terminal.

FIG. 9 is an example of a screen for setting a schedule-related calendar function on a creator terminal.

DETAILED DESCRIPTION OF THE EMBODIMENTS

Figure 1:
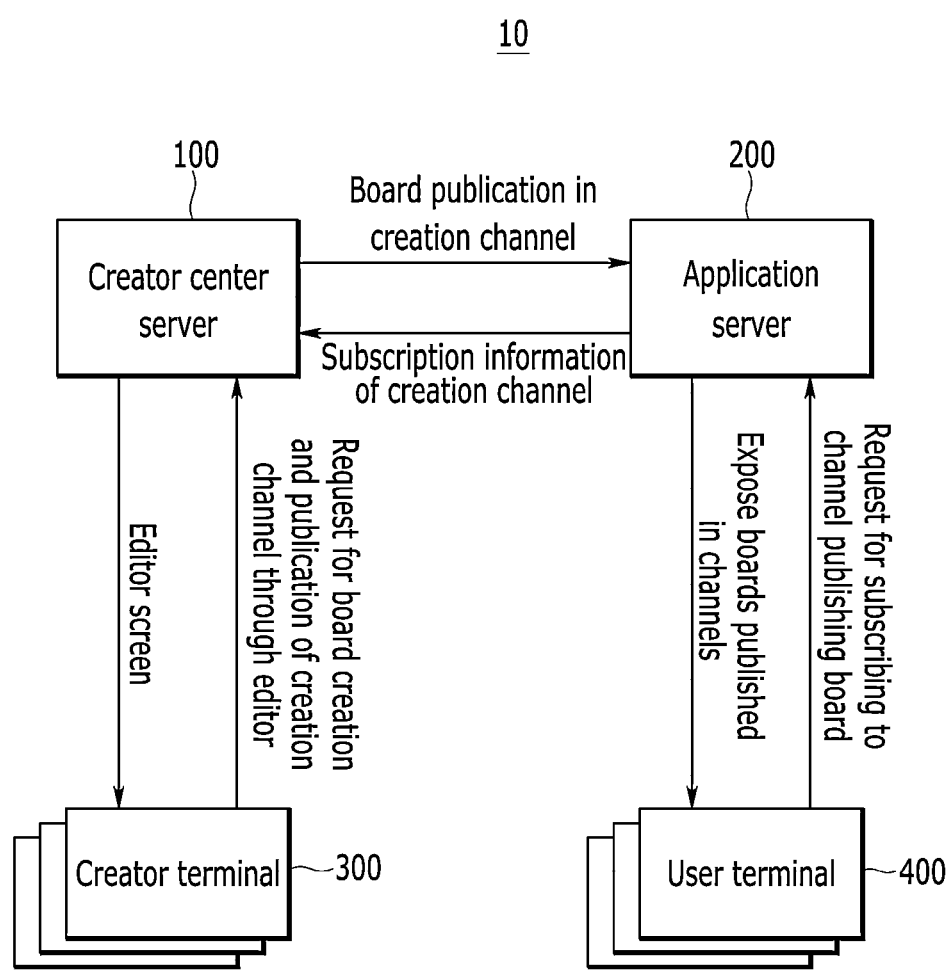
FIG. 1 is a configuration diagram of a subscription system according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and descriptions are to be regarded as illustrative in nature and not restrictive. Like reference numerals designate like elements throughout the specification.

Throughout the specification, when a part is referred to "include" a certain constituent element, it means that it may further include other constituent elements rather than exclude other elements, unless specifically indicates otherwise. In the description, the terms such as " . . . unit", " . . . er/or", " . . . module", and the like refer to units that process at least one function or operation, which may be implemented with a hardware, a software, or a combination thereof.

A server may include at least one processor, a memory for loading a computer program executed by the processor, a storage device for storing a computer program and various data, and a communication interface. In addition, the server may further include various constituent elements. A processor is a device for controlling an operation of the server, and may be a processor of various types that processes instructions included in a computer program. For example, the processor may be a central processing unit (CPU), a micro processor unit (MPU), a micro controller unit (MCU), a graphic processing unit (GPU), or may be configured to include at least one of any type of processor well known in the art of the present disclosure. A memory stores various data, instructions and/or information. The memory may load a corresponding computer program from a storage device so that instructions described to execute an operation of the present disclosure are processed by the processor. The memory may be, for example, a read only memory (ROM), a random access memory (RAM), and the like. The storage device may non-temporarily store a computer program and various data. The storage device may include a hard disk, a removable disk, a non-volatile memory such as a read only memory (ROM), an erasable programmable ROM (EPROM), an electrically erasable programmable ROM (EEPROM), and a flash memory, or any type of computer readable recording medium well known in the art of the present disclosure. The communication interface may be a wired/wireless communication module supporting wired/wireless communication. The computer program includes instructions executed by a processor, and is stored on a non-transitory computer readable storage medium. The instructions make the processor to execute the operation of the present disclosure.

A terminal includes an application/program, being a software stored on a computer readable storage medium, and a hardware such as a processor, a memory, a display, and a communication module. The processor cooperates with hardware to run the application. The display may display a user interface screen provided by an application, and may receive user input, for example, may receive touch input. The communication module communicates with the server via a communication network. The terminal may be implemented in various forms. Though a mobile terminal is described as an example, the terminal may be implemented in a form of a tablet-type terminal such as a smart pad, various types of computers such as a laptop computer, a wearable device, a TV terminal, and the like.

The application is a software stored on a computer readable storage medium, and includes instructions and data for executing the performing an operation of the present disclosure. The application is installed on the terminal, is executed on the terminal, and communicates with a designated server via a communication network.

As will be described below, the application exposes a board composed of contents curated by a creator, provides a subscription service that supports subscribing to a channel by adding a channel having published a board as a friend, and displays an interface screen described in the present disclosure. The application may be an instant messaging application or an application interworking therewith. In the description, the application is described to be the instant messaging application. In the description, the terminal that executes an application and communicates with an application server is described as an operating entity.

In the description, it is assumed that the board is a space for exposing contents including a plurality of contents grouped by one subject (board title) and a unit of contents distribution, and a board published by a creator is exposed on a slot occupying a certain area on a screen.

The creator can publish and manage the board by curating contents through an editor displayed on the terminal. Since the creator publishes the board on one's own channel, the channel may be considered to be a publishing entity. The channel where the creator publishes the board is referred to as a creation channel, and a creation channel to which a user subscribes is referred to as a subscription channel. A user may subscribe to a creation channel in various ways, and subscribe to the corresponding channel by adding the channel as a friend. Here, the channel is an account that has subscribed to an instant messaging service providing an instant messaging application. A user who is recommended or subscribed to a board published in a channel is also a subscriber who has subscribed to an instant messaging service and can use the instant messaging application. When a channel is added as a friend in the instant messaging application, the channel becomes included in a friend list, thereby subscribing to the corresponding channel in such a friend-adding way. In particular, a user can send or receive a message via a chat room with a channel opened in the instant messaging application.

Figure 2:
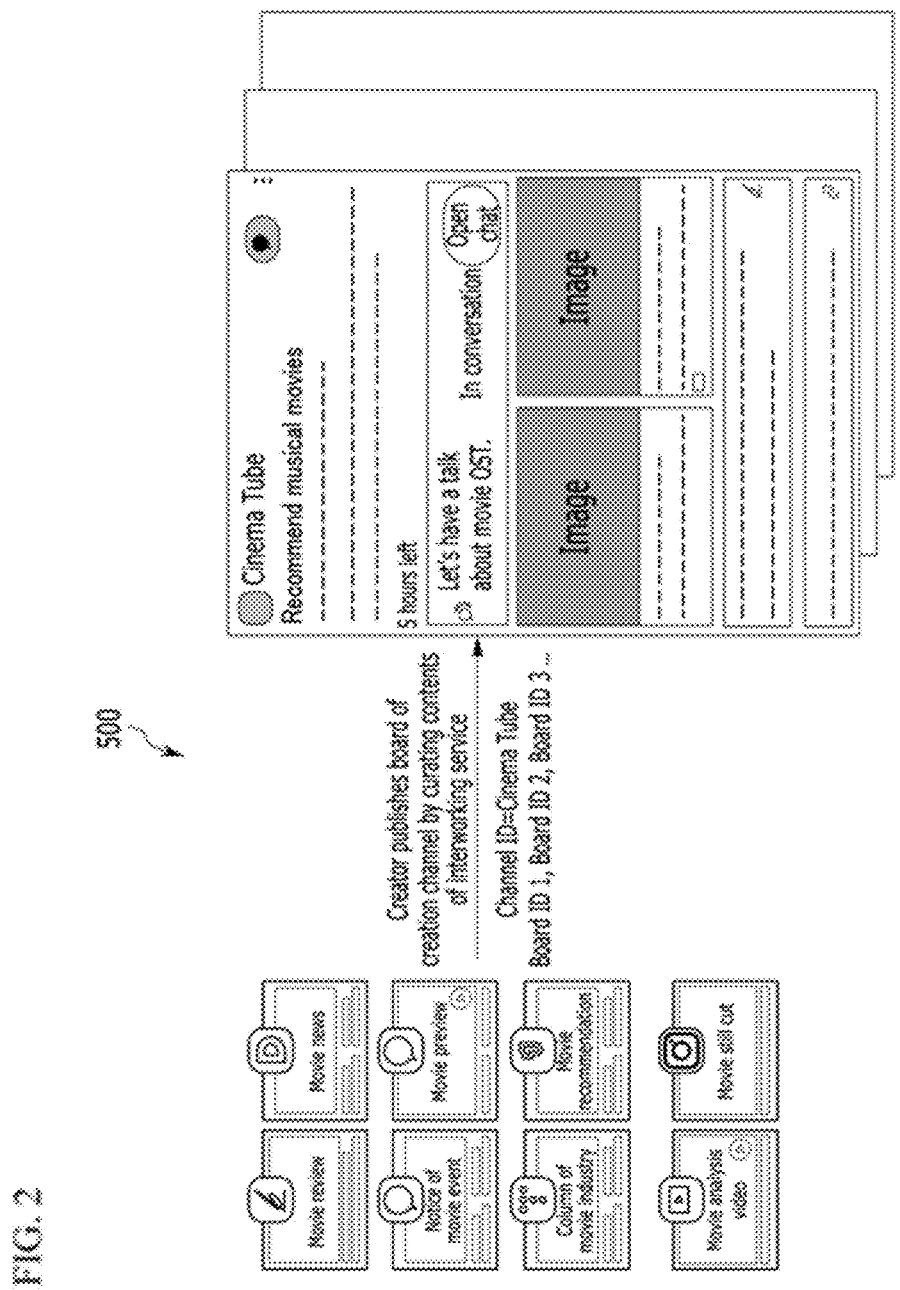
FIG. 2 is a diagram illustrating a board created from various content sources according to an embodiment.
Figure 3:
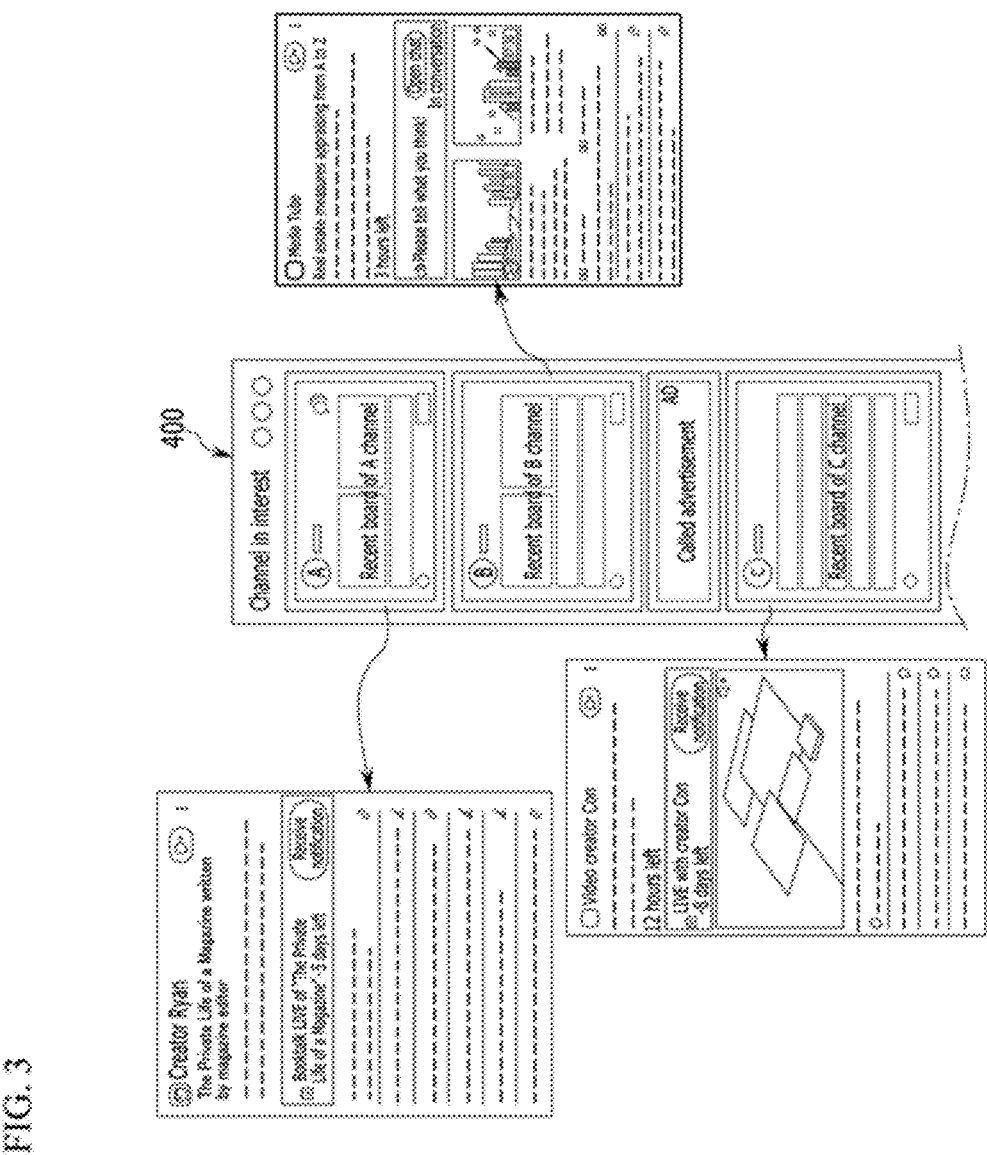
FIG. 3 is an exemplary diagram of an interface screen on which boards are exposed according to an embodiment.

FIG. 1 is a configuration diagram of a subscription system according to an embodiment, FIG. 2 is a diagram illustrating a board created from various content sources according to an embodiment, and FIG. 3 is an exemplary diagram of an interface screen on which boards are exposed according to an embodiment.

Referring to FIG. 1, a subscription system 10 may include a creator center server 100, an application server 200 that exposes online a board published in the creator center server 100 and manages a subscription, a creator terminal 300 that accesses the creator center server 100, and publishes and manages a board, and a user terminal 400 which an application is installed on and interworks with the application server 200.

The creator center server 100 and the application server 200 interwork with each other to provide a subscription service. In the description, the creator center server 100 and the application server 200 are separately described, but a design of the server may be variously changed.

The application server 200 may provide other services implemented in the application in addition to the subscription service that exposes the published board and manages the subscription. In the description, the subscription service related to the present disclosure will be mainly described.

Meanwhile, the creator terminal 300 may also be a user terminal 400 that installs an application and interworks with the application server 200 like the user terminal 400. However, for convenience, a creator who creates a board and a user (subscriber) who browses a board curated by the creator are described separately.

The creator center server 100 provides the creator terminal 300 with an editor screen on which a board can be created by curating produced contents and/or collected contents, can be published in a creation channel, and can be managed through change/deletion and the like.

The creator terminal 300 may display an editor screen, and transmit, to the creator center server 100, a request for board creation and publication, board management information, and the like. The creator center server 100 may create and publish a board based on board creation information input from the creator terminal 300 via the editor screen.

When a board is published, a board identifier (board ID) may be assigned. Meanwhile, the creator terminal 300 may be provided with the editor screen by executing an application, or be provided with the editor screen by executing a program (e.g., a browser) different from the application.

The creator center server 100 may interwork with various content sources and display a list of contents fetched from the content sources. The creator may create a board by curating contents and change the created board. Further, the creator can provide the board to the editor screen through which a publication of a board can be requested. The creator center server 100 can provide not only contents, but also the editor screen that enables the creator to implement, on the board, various functions (an open chat function, a schedule-related calendar function, a purchase function, a sponsorship function, and the like) supporting interactions with users on the board. Here, the open chat function means a function that provides a chat room in which participants can freely join an open chat regardless of whether they are related as friends in the instant messaging application. When the creator sets the open chat function on the board, an access link for the open chat room is created. If a user selects the access link on a published board, the corresponding open chat room can be displayed on the screen. Here, the access link for the open chat room may be implemented on an action button. The schedule-related calendar function is a function for registering a schedule predetermined by the creator in a calendar. If the creator sets the schedule-related calendar function on the board, the user can check the schedule set on the published board through the calendar. At this time, the schedule-related calendar function may provide a simple schedule for registering the schedule in the calendar, or may provide online participation or open chatting via a participation link or an open chat link. Here, the calendar may be provided by the instant messaging application. When the creator sets a purchase function on the board, an interworking link with an interface providing a product introduction and product purchase is generated. Then, the user can use the purchase function via the interface screen provided by the interworking link implemented on the action button of the published board. When the creator sets the sponsorship function on the board, an interworking link with an interface for providing sponsorship is generated. Then, the user can use the sponsorship function via the interface screen provided by the interworking link implemented on the action button. In addition, when the creator sets various functions on the board, links interworking with interfaces for providing the corresponding functions are generated. The user can use the corresponding function via the links implemented on the action button of the published board.

Referring to FIG. 2, a creator puts to keep linkages with interworking services through which contents can be selected on an editor screen provided through a creator terminal 300. For example, the interworking services may be Brunch, Kakao TV, Tistory, Daum News, YouTube, Instagram, and the like. Thereafter, the creator may select contents corresponding to a subject (e.g., recommendation of musical films giving glittering consolation) from the interworking services, and may create and publish a board 500 curated with contents in accord with the subject. The creator may include a content that can be specified by an address link (URL) as well as content fetched from the interworking service in the board 500. Additionally, the creator can load a published board and add a content included in the loaded board to a new board.

The published board 500 is a content distribution unit including a plurality of contents grouped by one subject (board title), and may have a unique board identifier (board ID) and a channel identifier (channel ID) in which the board is published.

When the creator owns or manages multiple channels, a specific channel (e.g., Cinema Tube) in which a board is to be published may be set as a creation channel among the multiple channels, and the board may be published on the creation channel.

The creator can write a board title and board description (option) on the editor screen, and generate and publish a board by selecting contents. The creator can publish the board by setting a disclosure setting of the board, a publication time point (present or scheduled), a category of the board, and whether to show a board guidance message of reward, and the like.

Meanwhile, on the editor screen provided through the creator terminal 300, the creator may set an interaction function to be provided in the board. The set interaction function may be expressed as, for example, an action button providing a function (e.g., open chat button), a function description (e.g., "Let's talk about a movie OST."), and function state (e.g., in conversation), in some area of the board 500. Here, the action button is a UI component programmed to perform an operation corresponding to a button name when selected. The button name may be variously changed. When a user navigates the board 500 via a user terminal 400 and selects an action button (e.g., open chat button), the user terminal 400 may display an open chat room linked to the function (open chat) set on the action button. If the action button provides a schedule notification function, the user terminal 400 may display a calendar for setting a schedule notification or register a corresponding schedule in a schedule notification bot.

As the function, for example, an open chat function, a schedule-related calendar function, a purchase function, a sponsorship function, and the like may be implemented. As the function, a single function may be implemented or multiple functions may be implemented in combination. On the other hand, the function implemented in the action button may be changed stepwise according to the passage of time or a user's selection. In addition, the function state may also be changed (e.g., 2 days ago, 1 day ago, in conversation, etc.) according to the passage of time or a user's selection. For example, if a user who received a recommendation for the board 500 selects an action button, "Receive notification button", for notifying an open chat schedule before open chat starts, the action button displays a state, "In receiving notification", until the open chat, being a next function, starts. Then, when it becomes a time point of the open chat schedule, the action button can be changed to an action button, "Open chat button", that implements a function that enables a user to select (e.g., click) to join the open chat room. When the open chat schedule ends, the action button may display a state, "Open chat is terminated", be deactivated, or be removed from the board.

Referring to FIG. 1 again, the creator center server 100 assigns a board identifier to the board created in the creator terminal 300 and publishes the board. The published board may be stored on a database accessible by the application server 200, or may be stored on a database managed by the application server 200. In the description, it can be described that the creator center server 100 transmits the published board to the application server 200. The creator center server 100 may generate a unique board identifier (board ID), and transmit, to the application server 200, the channel identifier (channel ID) where the board is published, the board identifier, and contents of the board. In this case, the creator center server 100 may transmit, to the application server 200, setting information of board publication, such as a disclosure setting of the board, a publication time point (present or scheduled), a category of the board, and whether to expose a board guidance message of reward.

In addition, the creator center server 100 may transmit board information changed/deleted in the creator terminal 300 to the application server 200.

The application server 200 may provide the user terminal 400 with recommendation boards selected from the boards published in the creator center server 100, and may also exposes the boards of the subscription channel on the user terminal 400. The application server 200 may disclose or close the board according to the setting information of board publication, may expose the board at the publication time point, and may recommend the board to users based on the category of the board.

The application server 200 may manage the board identifier and the identifier of a channel in which the board is published, and may manage an exposure condition set for each user for a channel or board (e.g., whether each user subscribed to the channel, whether each user sets to "display this channel less", and the like). The application server 200 may or may not expose the corresponding board to the user terminal 400 according to the exposure condition set for the channel or board.

The application server 200 may expose recommendation boards through a discovery tab displayed on the user terminal 400, and may expose boards recently published in a subscription channel through a subscription tab distinct from the discovery tab. Here, the recommendation boards may not include a board published in the subscription channel.

The application server 200 may recommend the board to the user, based on at least one of interests preset by the user, behavior information of the user (inquiry, subscription, recommendation, purchase, etc.), personal information of the user (gender, age, residence, or occupation, etc.). The application server 200 may use the behavior information of the user that is collected from an instant messaging application, and/or web or an application interworking with the instant messaging application.

The user terminal 400 may receive an input of a subscription request for a channel that has published the recommendation board from the user, and may request to register as the subscription channel of the user by transmitting information on the subscription-requested channel to the application server 200. The user may make a subscription request in a way of adding a channel as a friend in the instant messaging application. When the user adds a channel as a friend in the instant messaging application, the channel becomes to be included in a friend list, thereby being able to subscribe to the corresponding channel in such a way of adding a friend.

Thereafter, the user terminal 400 may expose the boards published in the subscription channel on the subscription tab. The application server 200 may provide subscription information of each creation channel to the creator center server 100.

Meanwhile, the user terminal 400 may receive a subscription cancellation request for a subscription channel from the user, and may request to release the user from the subscription channel by transmitting information about the channel for which the subscription cancellation is requested to the application server 200. Thereafter, the user can search for boards published in the subscription cancellation channel in the search tab. The method for cancelling subscription of a channel may be various. After a user has subscribed to a channel through adding a friend in the instant messaging application, the user can request to cancel the subscription to the channel while maintaining a friend relationship. Alternatively, after the user has subscribed to a channel through adding a friend in the instant messaging application, the user may request to cancel the subscription to the channel by blocking the friend or deleting the friend.

Referring to FIG. 3, a user terminal 400 may expose boards recently published in a subscription channel via a subscription tab. The boards that was published recently in the channel (subscription channel) added as a friend by a user may be exposed on a screen provided by the subscription tab. An exposure order of the boards may be set by the user, or may be set in various ways, such as in a publication date order and in a subscription date order. When a certain channel is subscribed (added as a friend), the user terminal 400 may expose a recent board of the corresponding channel in a slot of the subscription channel.

Meanwhile, the user terminal 400 may expose recommendation boards recommended by the application server 200 via a discovery tab.

Hereinafter, an interface screen that is provided to a creator terminal 300 by a creator center server 100 and displayed on the creator terminal 300, and an interface screen that is provided to a user terminal 400 by the application server 200 and displayed on the user terminal 400 will be described in detail.

Figure 4:
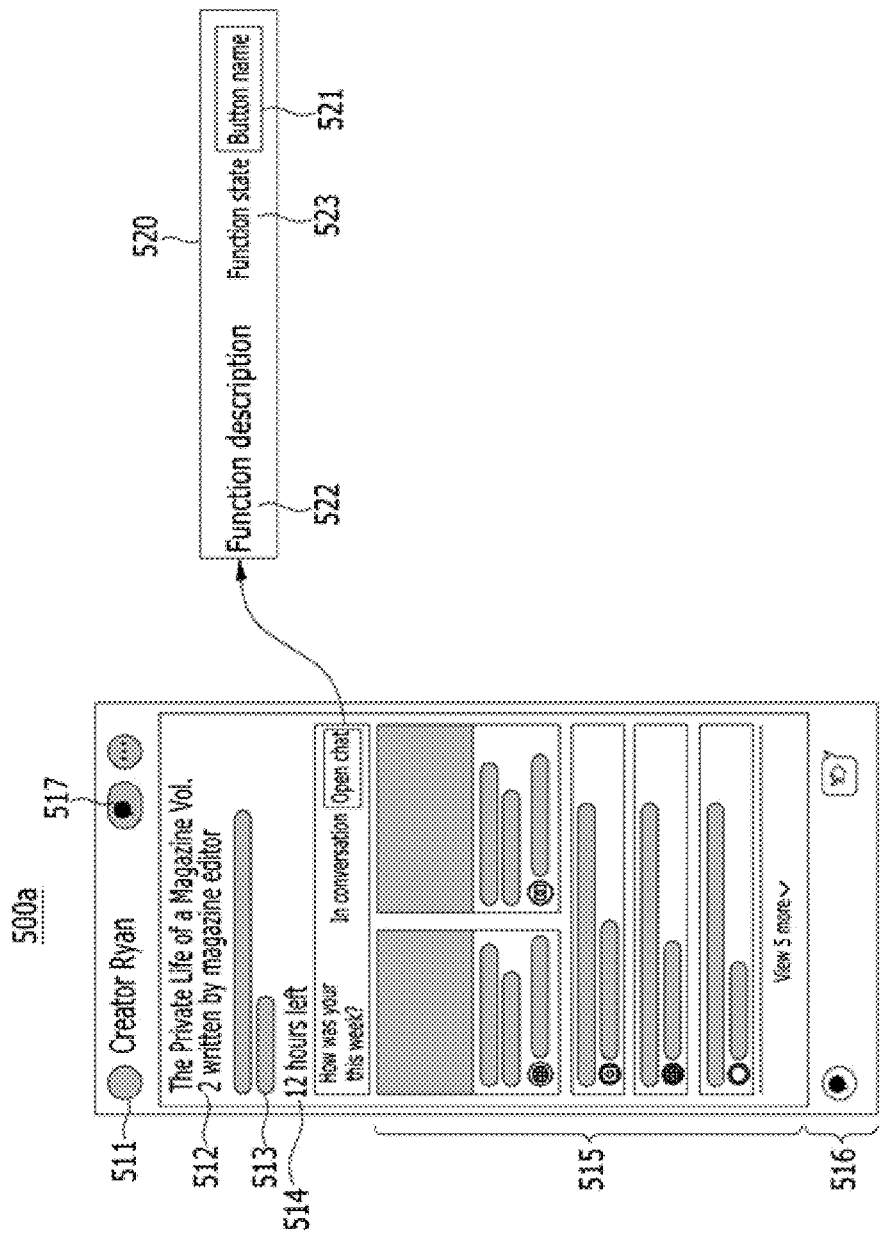
FIG. 4 is a diagram illustrating a board configuration according to an embodiment.

FIG. 4 is a diagram illustrating a board configuration according to an embodiment.

Referring to FIG. 4, through an editor provided by a creator center server 100, a creator can publish a board 500*a* by curating contents obtained from various content sources.

The board 500*a* may be composed of areas of a creation channel name 511, a board title 512, a board description 513, a board publication time 514, arranged contents 515, and the like. The board description 513 may be selectively included by the creator, and an arrangement of the contents 515 may follow a template selected by the creator. The board publication time 514 may be a criterion for judging whether a board is recent or not.

The exposed board 500*a* may be exposed including a user response area 516 that can receive sharing and/or a reaction of a user. The user can share a board in a chat room and the like via a designated button in the user response area 516. The user can input a reaction for a board through the designated button in the user response area 516. The reaction method that can be input may be various. For example, sending a message, clicking a recommendation, giving a gift, sponsoring, and the like may be provided.

The exposed board 500*a* may include a button 517 through which a user can subscribe to a channel (add a friend).

The board 500*a* may include an interaction area 520 supporting interactions between creators and users. The interaction area 520 may include an action button 521 providing a function, and may display a function description 522 and a function state 523. The action button 521 may be selected (e.g., clicked), and a button name (e.g., receive notification, open chat, join, purchase, sponsor, etc.) may be displayed.

Here, the action button 521 is a UI component programmed to perform an operation corresponding to the button name when selected, and the button name may be variously changed. A function provided through the action button 521 may be changed stepwise according to the passage of time or a user's selection. Also, the function state also may be changed (e.g., 2 days ago, 1 day ago, in conversation, etc.) according to the passage of time or the user's selection.

Figure 5:
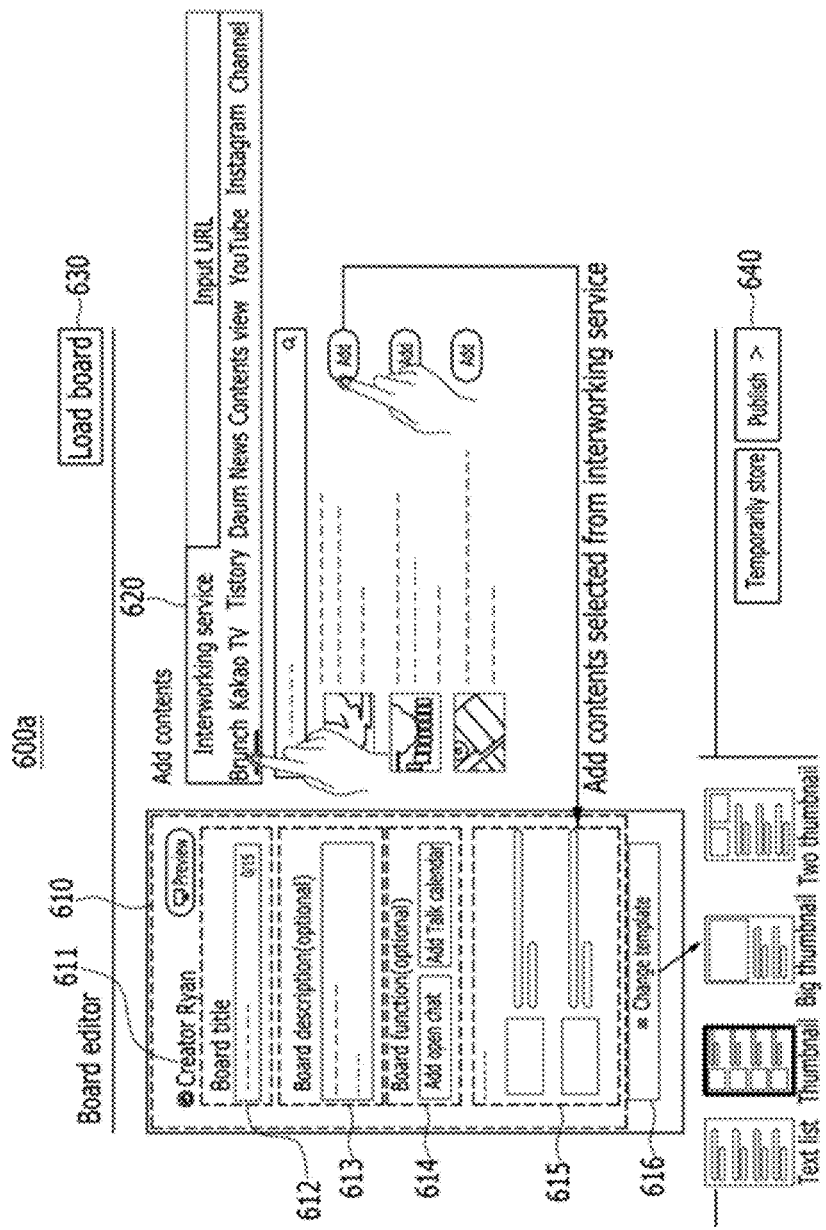
Figure 6:
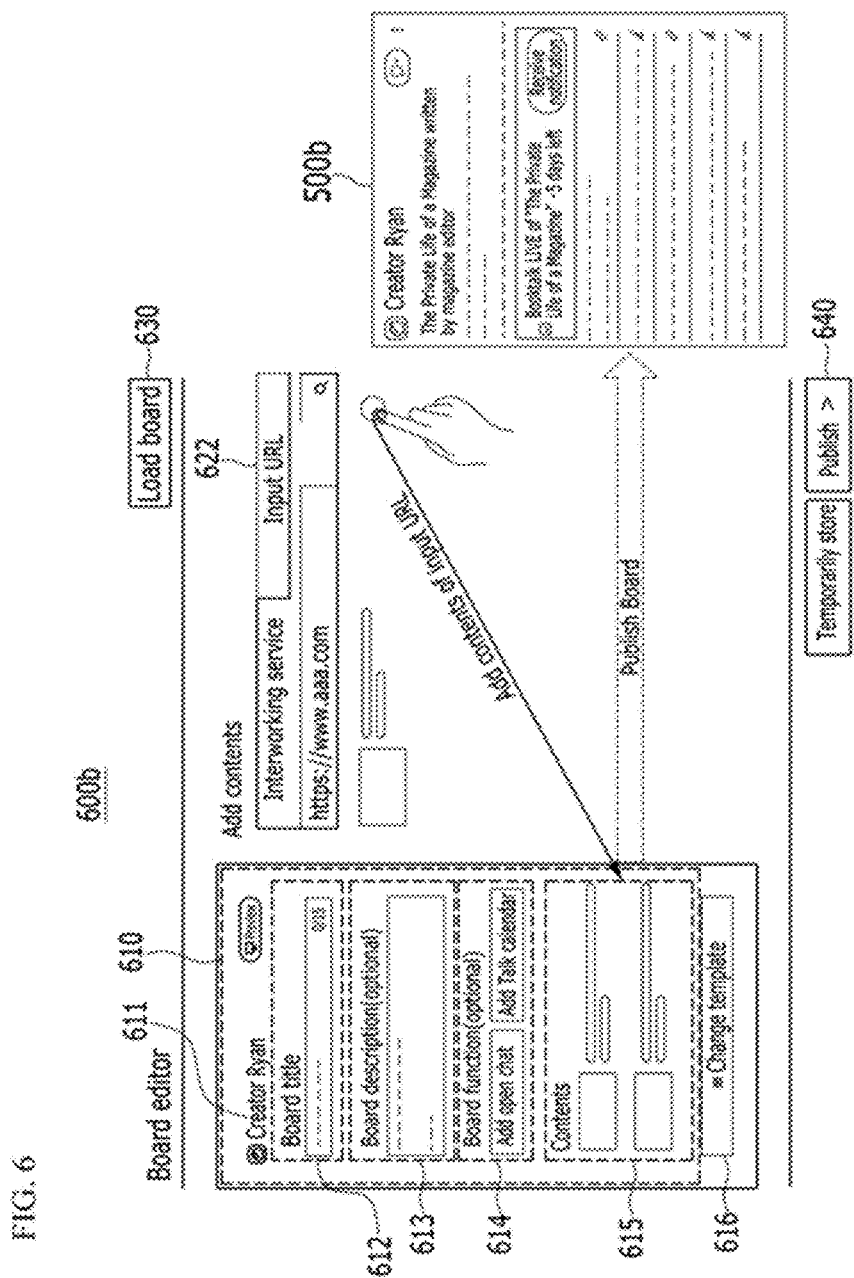

FIG. 5 to FIG. 7 are examples of an editor screen displayed on a creator terminal.

Referring to FIG. 5 to FIG. 7, a creator center server 100 provides a creator terminal 300 with an editor (board editor) that can create and publish a board. A creator center server 100 can provide an editor screen fir for a type of the creator terminal 300.

In the description, a PC screen is described as an example and may be provided as a mobile screen.

First, referring to FIG. 5, a creator terminal 300 displays an editor (board editor) screen 600a where a board can be created and published. It is assumed that the creator terminal 300 displays the editor screen 600a where a board can be published in a channel of creator Ryan.

The editor screen 600a displays a board creation area 610 through which information constituting the board can be input. The board creation area 610 may display a channel name 611, being a publishing entity, and may display a board title area 612, a board description area 613, a board function area 614, and a content area 615 that are inputtable areas. Here, the board description area 613 and the board function area 614 may be selectively input. The board function area 614 displays functions that can be provided by the board (e.g., an open chat function, a schedule-related calendar function, a purchase function, a sponsorship function, etc.). When the creator selects a desired function in the board function area 614, the editor screen 600a can provide a function setting screen through which a description corresponding to the function, an activation time point (scheduled time), an activation period, and the like may be set, and can set and display the function based on the input information. For example, when a creator selects the open chat function, a chat room name (e.g., "Booktalk LIVE of The Private Life of a Magazine"), an activation time point of an open chat room (e.g., immediately after publication or scheduled), and an activation period (e.g., 2 hours) may be set on the setting screen. The method for adding functions on the board will be described in detail with reference to another drawing.

The editor screen 600a may display a template change button 616 for setting a template of the content area 615. Contents of the content area 615 are arranged according to the template selected by the creator.

The contents included in the content area 615 can be fetched from interworking services or can be fetched through inputting an address link (URL). The interworking services are content sources that are linked to fetch contents, and may include various services such as Brunch, Kakao TV, Tistory, Daum News, YouTube, and Instagram. The services may be registered as the interworking services by the creator in advance.

The editor screen 600a displays an interworking service area 620 where a content can be selected. Through the interworking service, a creator can select an article or image made by himself/herself as the content of the board, and can select an article or image made by others as the content of the board. At this time, a source of the content is indicated on the published board. The interworking services displayed in the interworking service area 620, such as Brunch, Kakao TV, Tistory, Daum News, YouTube, and Instagram, can be set to be linked by the creator in advance.

The editor screen 600a may display a board load button 630. The creator can fetch the created board by selecting the board load button 630, and then can add a content included in the fetched board to a new board.

The editor screen 600a may display a publication button 640.

Referring to FIG. 6, an editor screen 600b can display a URL input area 622 where a content of an address link (URL) can be added to a content area 615. The content of the address link input to the URL input area 622 may be added to a board.

A creator can check and modify a created board 500b through preview.

When all mandatory information is input in the board creation area 610 and then a publication button 640 is input, a board 500b can be published. At this time, when the publication button 640 is input, a board publication setting screen is provided, and a board may be published based on information input in the board publication setting screen.

Referring to FIG. 7, a board publication setting screen 600c may display a screen for inputting publication settings, such a disclosure setting of a board, a publication time point (present or scheduled), a category of a board, whether to expose a board guidance message of reward.

When a publication button is selected on the board publication setting screen 600c, a creator terminal 300 requests to publish a board based on information input in the board creation area 610 from a creator center server 100. The creator center server 100 assigns a board identifier to the board requested to be published, and then publishes the board. The creator center server 100 may transmit, to an application server 200, a channel identifier in which the board is published, the board identifier, contents of the board, and board publication setting information.

Through such an editor, the creator can generate and change a board by curating contents from various content sources, can publish the board, and can conveniently implement various functions supporting interactions with users on the board.

FIG. 8 is an example of a screen for setting an open chat function on a creator terminal, and FIG. 9 is an example of a screen for setting a schedule-related calendar function on a creator terminal.

Referring to FIG. 8 and FIG. 9, a function setting screen displayed on a creator terminal 300 will be described. Here, it is assumed that the creator terminal 300 is a mobile terminal. The function setting screen may also be provided as a PC screen.

Referring to FIG. 8, when a creator selects an open chat function as a function of a board on a data screen, the creator terminal 300 may display a function setting screen 600d. Referring to an editor screen described with reference to FIG. 5 and FIG. 6, a board function area 614 may display functions (e.g., an open chat function, a schedule-related calendar function, a purchase function, a sponsorship function, etc.) that can be provided by the board. The open chat function means a function that provides a chat room where participants can freely join an open chat regardless of whether they are set to be friends in an instant messaging application.

The function setting screen 600d displays an input means that can receive information to be displayed in an interaction area of the board. The function setting screen 600d can receive input of a chat room name related to the open chat, a chat room introduction, an activation time point and activation period of the open chat.

When the board is published, the chat room name input in the function setting screen 600d may be displayed in a function description 522 of an interaction area 520, and the chat room introduction may be displayed in the interaction area 520 or displayed in an established open chat room.

The activation time point of open chat may be selected to be immediately after a publication, or be scheduled for a time point of the future.

The activation period is a period during which an open chat room is open. When the activation period lapsed after the activation time point, entering the open chat room may not be allowed.

The creator can add the open chat function on the board after inputting setting information related to the open chat on the function setting screen 600d.

The open chat function may be set to be activated as soon as the board is published. In this case, a button name of an action button on the board may be displayed as "open chat", a name of the open chat room (e.g., "Booktalk LIVE of The Private Life of a Magazine") may be displayed in the function description, and the number of participant or being in conversation may be displayed as the function state. When the "open chat" action button is selected, it is implemented to move to the established open chat room. As described above, when the creator sets the open chat function on the board, an access link for the open chat room is generated. When a user selects an action button where the access link is implemented on the published board, the open chat room of the corresponding access link can be displayed on the screen.

Meanwhile, when an activation time point of an open chat is scheduled, a function setting screen 600e may display an input means for receiving an input of the start time point of the open chat and an activation period of the open chat.

The creator can add the open chat function on the board after inputting setting information related to the open chat on the function setting screen 600e.

Since the open chat function is scheduled, the open chat function is activated when it becomes the scheduled activation time point after the board is published. Here, before the open chat starts, a button name of the action button may be displayed as the button name before activation (e.g., "Receive Notification") on the board, the name of the open chat room (e.g., "Booktalk LIVE of The Private Life of a Magazine") may be displayed as the function description, and remaining time (e.g., 5 days left) up to activation of the open chat function may be displayed as the function state. When the "Receive Notification" action button is selected, it may be implemented to display a means for receiving a notification on the screen.

Afterward, when an open chat starts, the button name of the action button on the board is changed to "Open Chat", and the number of participants participating in the open chat may be displayed as the function state. When the open chat ends, an interaction area including the action button is deleted from the board, thereby being not to be exposed on the board.

On the other hand, when the open chat function is scheduled but receiving a notification is not set, the action button may be deactivated on the board so as not to be selected if the button name of the action button is "Open Chat" and an open chat is not started. Here, after the open chat is started, the action button may be activated so as to be selected and to enable to enter the open chat room.

Referring to FIG. 9, when a creator selects a schedule-related calendar function as a function of the board, a creator terminal 300 may display a function setting screen 600f. The schedule-related calendar function is a function to register a schedule predetermined by the creator in a calendar. If the creator sets the schedule-related calendar function on the board, a user can check the predetermined schedule on a published board through the calendar.

The function setting screen 600f displays an input means through which information to be displayed in an interaction area of the board can be received. The function setting screen 600f may receive an input of a schedule name (schedule title), and a start time point and an end time point of the schedule. The function setting screen 600f may further receive an input of schedule-related information, such as a schedule description, a participation link, and a place. By inputting the participation link, the creator can set so that participants of the schedule can participate in an online meeting through the participation link (URL). By inputting a certain place, a participant may lead some participants of the schedule to joining an offline meeting at the corresponding place. As described above, the schedule-related calendar function can provide a simple schedule for registering the schedule in the calendar. Through the participation link or an open chat link, the schedule-related calendar function can support participation online or provide an open chat.

When the board is published, the schedule name input in the function setting screen 600f is displayed in a function description 522 of the interaction area 520.

Before the schedule starts, a button name of an action button on the board may be displayed as the button name before the schedule starts (e.g., "Receive Notification"), the schedule name (e.g., "Ebook Release of The Pleasures and Sorrows of Work") may be displayed as the function description, and remaining time (e.g., 5 days left) up to the schedule may be displayed as the function state.

Thereafter, when the schedule starts, the action button on the board is changed to a button name corresponding to a state after the schedule starts. For example, if the participation link is not input in the function setting screen 600d, it is a simple schedule. Thus, the button name of the action button may be changed to "View Schedule" in the calendar. If the participation link is input in the function setting screen 600d, the button name of the action button may be changed to "Join". When the "Join" action button is selected, it is implemented to move to the participation link.

When the schedule ends, the button name of the action button is maintained as "View Schedule" in the calendar, and the function state may be displayed as a terminated state. Alternatively, when the schedule ends, the interaction area including the action button may be deleted from the board, thereby being not to be exposed on the board.

Figure 10:
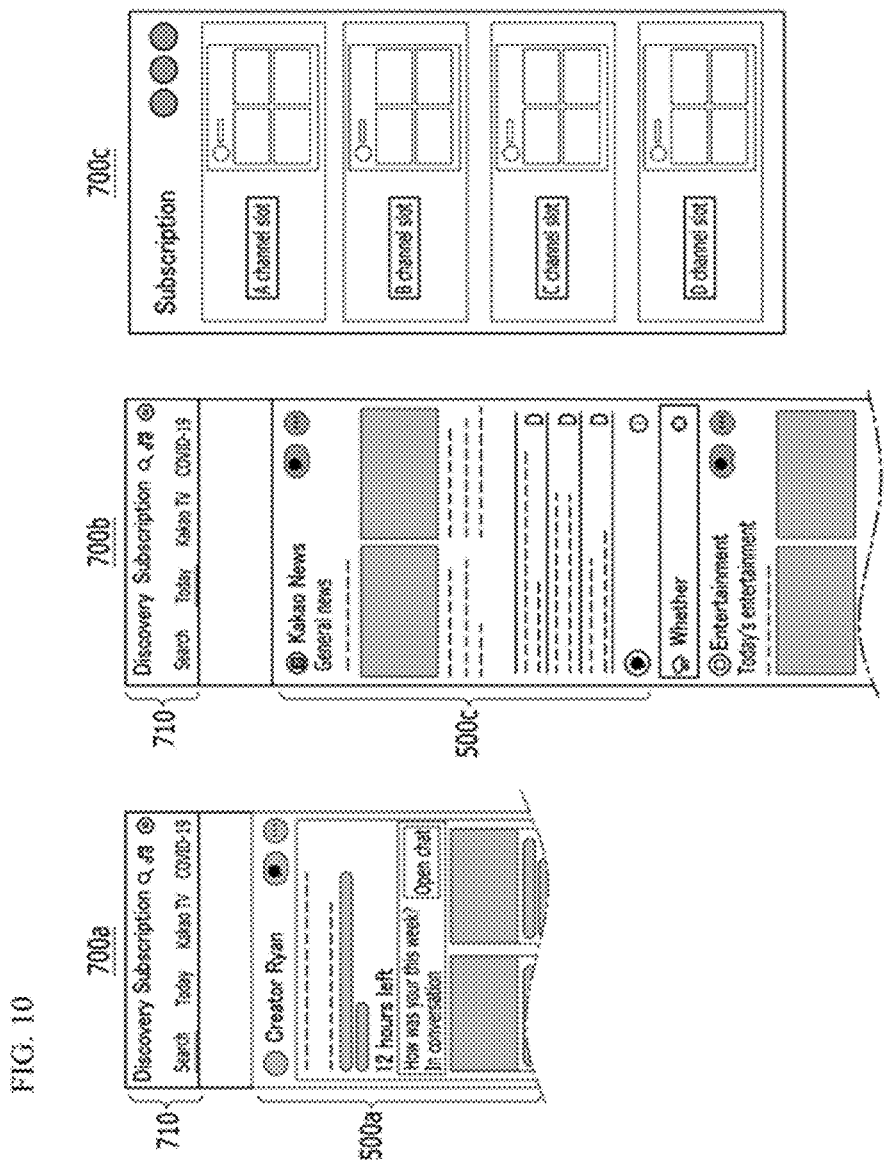
FIG. 10 and FIG. 11 are examples of an interface screen displayed on a user terminal.
Figure 11:
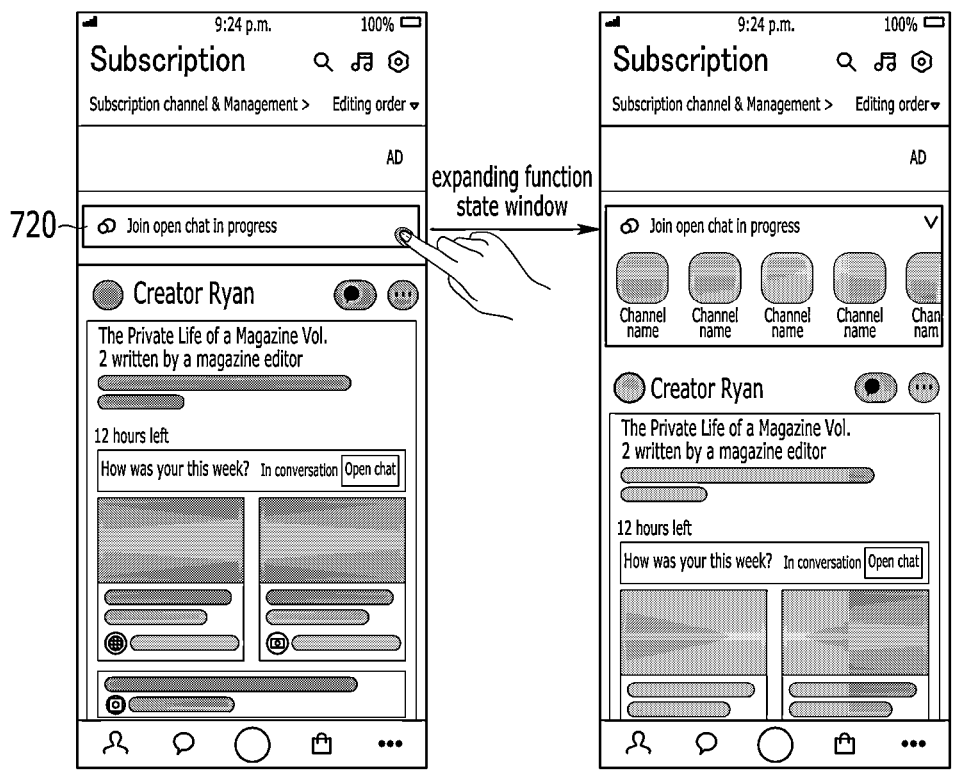

FIG. 10 and FIG. 11 are examples of an interface screen displayed on a user terminal.

Referring to FIG. 10 and FIG. 11, an application server 200 may provide a user terminal 400 with recommendation boards selected among the boards published in a creator center server 100, and may also expose boards of a subscription channel to the user terminal 400.

The user terminal 400 may display a tab area 710 including a discovery tab exposing the recommendation boards and a subscription tab exposing boards recently published in the subscription channel.

Screens 700a and 700b of the user terminal 400 may display a discovery tab that may be composed of various sub-tabs. For example, the discovery tab may be composed of a search tab, a today tab, a multimedia tab (e.g., Kakao TV), a timeliness tab (e.g. Corona 19), and the like. Here, a configuration and order of the sub-tabs may be changed.

The search tab screen 700a may display recommendation boards for a user, including a board 500a published on a specific channel (e.g., creator Ryan channel). At this time, the search tab screen 700a may display boards published in a non-subscription channel and a subscription channel. The search tab screen 700a may display not only a board of a created board type but also a board of a data board type. Meanwhile, the search tab screen 700a may display a recommendation card that recommends contents that are collected from not only a board of a single channel but also boards of multiple channels. Further, the search tab screen 700a may lead to selecting a specific channel or a content displayed in the recommendation card, and to entering a board curated with the corresponding contents.

Through the search tab screen 700a, a user's interest-based recommendation board, popular board, and the like may be distributed.

In the search tab screen 700a, a user can discover a board published in the channel of creator Ryan and subscribe to the channel (add as a friend). Then, the boards published in the channel of creator Ryan can be exposed in the subscription tab.

A today tab screen 700b may be composed of contents collected and edited by an algorithm and may mainly display a data board 500c containing timely public interests. The today tab screen 700b may be personalized based on interests of a user.

A screen 700c of the user terminal 400 may display a subscription tab that exposes boards recently published in a subscription channel.

The subscription tab screen 700c does not continuously expose a feed according to a scroll in order to make the user stay long, but, in order for the user to completely consume contents of the channel subscribed by the user, may feed a recent board published in the corresponding channel to a slot of the subscribed channel. In the subscription tab screen 700c, slots of the subscription channel may be arranged based on a setting, such as user editing order and an order of the recent board.

For example, if the subscription channels of a user are A channel, B channel, C channel, D channel, and E channel, and each of A channel, B channel, C channel, and D channel has a recent board, the subscription tab screen 700c can display one board for each of A channel, B channel, C channel, and D channels one by one.

Referring to FIG. 11, a user can check a function of each board while scrolling boards published in interested channels and use the checked function. However, when a plurality of boards is exposed, it is possible to be unable to use the function.

To solve such a problem, a screen 700d of a user terminal 400 may display a function state window 720 including a function state notification message when a function (e.g., an open chat function) is included in boards published in a subscription channel. The function state window 720 may be displayed in a format of a banner at the top of the screen, but the position and method of display may be variously changed.

An application server 200 or a user terminal 400 checks whether a function (e.g., open chat function) is included in the boards displayed on the screen 700d. When one or more function is identified, the application server 200 or the user terminal 400 may display the function state window 720 that provides notification information with being grouped, for functions provided through a recent board in the channels. For example, the function state window 720 may display, for example, "Join open chat in progress", "Join open chat in progress on OO channel", "Join N open chats in progress", and the like.

When the function state window 720 is selected, the function state window 720 may be expanded (unfolded). The expanded function state window 720 may display channels providing the function (open chat). When the user selects a channel in the expanded function state window 720, the user terminal 400 may convert from the board of the selected channel to a screen providing a predetermined function. For example, if the user selects A channel in the expanded function state window 720, the user terminal 400 can enter an open chat room in progress in A channel.

Figure 12:
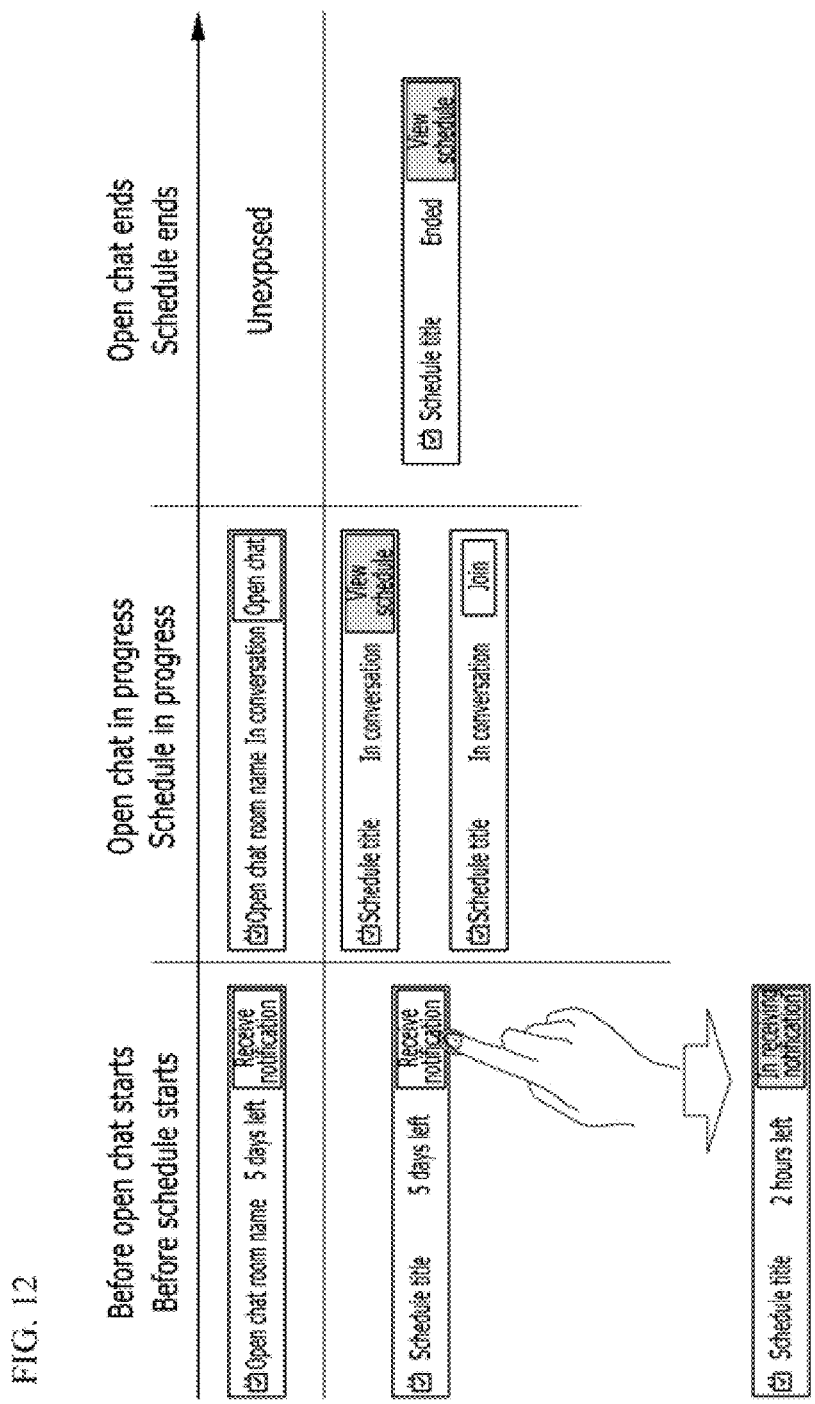
FIG. 12 is a diagram illustrating an interaction area of the board varying with time.
Figure 13:
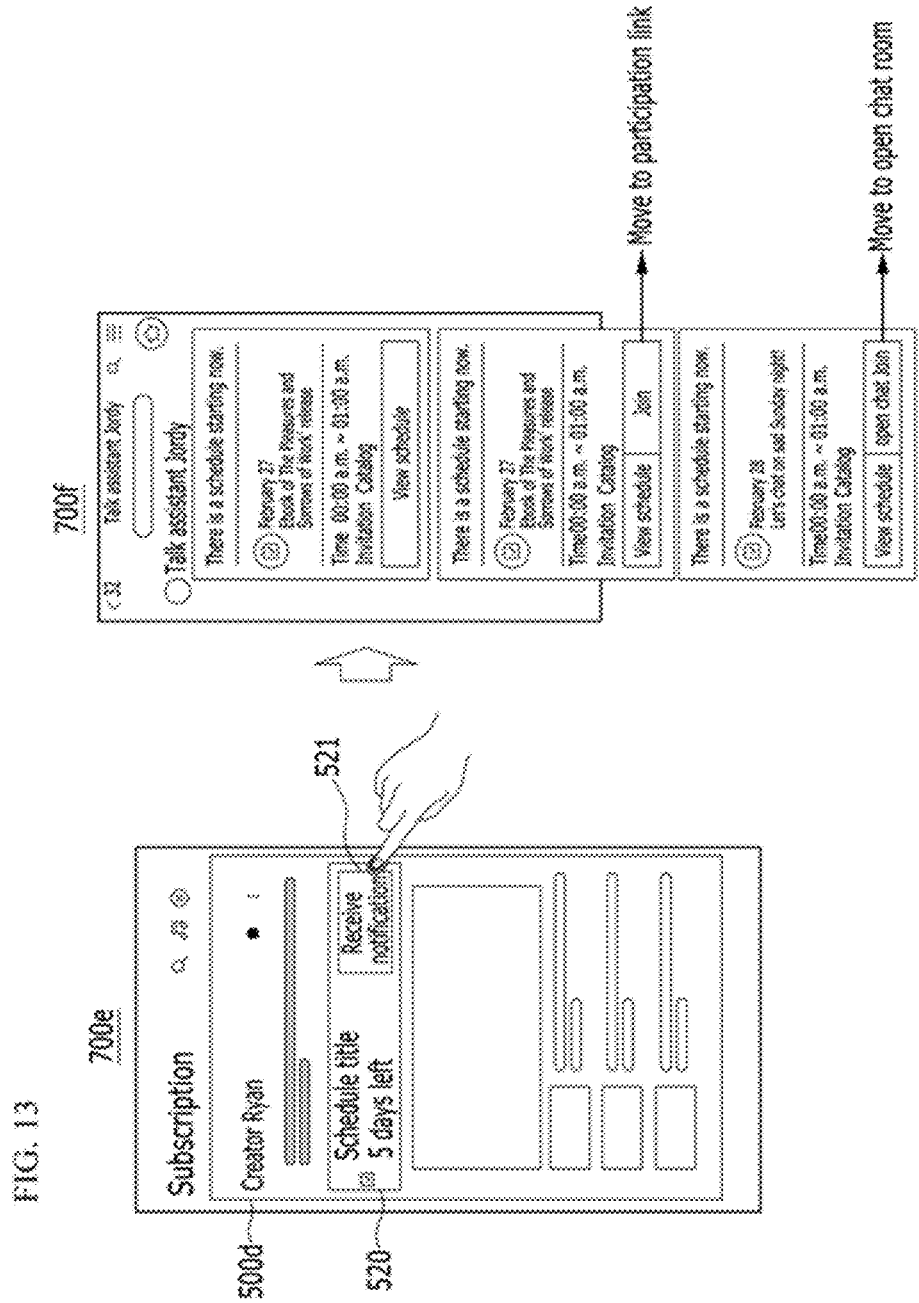
FIG. 13 is a diagram illustrating a method for notifying a function set on a board.

FIG. 12 is a diagram illustrating an interaction area of the board varying with time, and FIG. 13 is a diagram illustrating a method for notifying a function set on a board.

Referring to FIG. 12, a published board may display an interaction area in which a function (e.g., an open chat function, a schedule-related calendar function, a purchase function) will be implemented. The function implemented in an action button can be changed stepwise according to the passage of time or a selection of a user. Here, the action button is a UI component programmed to perform an operation corresponding to a button name when selected, and the button name may be variously changed according to a function or state.

Before an open chat starts, an action button of "Receive notification" and a state of an open chat (e.g., 5 days left) may be displayed in the interaction area providing the open chat function. When the open chat starts, the action button of "Open chat" and a state of the open chat (e.g., in conversation, number of participants, etc.) may be displayed. When the open chat is terminated, the interaction area including the action button is deleted from the board, thereby being not to be exposed on the board.

Before a schedule is started, the action button of "Receive notification" and a state of the open chat (e.g., 5 days left) may be displayed in the interaction area providing the schedule-related calendar function. When the schedule is started, the action button on the board is changed to a button name corresponding to a state after the schedule is started. If a participation link has not been input for the schedule, an action button of "View schedule" and a schedule state (e.g., in progress) may be displayed. Further, if the participation link has been input for the schedule, an action button of "Join" and the schedule state (e.g., joinable, in progress) may be displayed. When the schedule ends, the action button of "View schedule" and a function state changed as a terminated state may be displayed. According to settings, when the schedule ends, the interaction area may be deleted from the board, and becomes to not be seen on the board.

Meanwhile, when the user selects the action button of "Receive notification" on the published board, the action button may be displayed with the button name changed to "In receiving notification". When it becomes to be a activation time point of an open chat or a start time of a schedule, the action button expressed as being in receiving notification may be changed to an action button of "Open chat" or an action button of "View schedule"/"Join".

Referring to FIG. 13, a screen 700e of a user terminal 400 displays a board 500d published in a channel of creator Ryan. The board 500d includes an interaction area 520 in which a function (e.g., a calendar function) is implemented. Since it is before a schedule of the function starts, an action button of "Receive notification" may be displayed.

When a user selects the action button 521 of "Receive notification", the action button may be displayed with being changed to "In receiving notification".

Thereafter, the application server 200 may send a notification message to the user terminal 400 having requested to receive a notification about the function of the board 500d. For example, the application server 200 may send a notification message to a chat room 700f with a schedule notification bot (e.g., Talk assistant "Jordy"), and the user terminal 400 may display a notification for a schedule set on the board 500 in the chat room 700f with the schedule notification bot.

At this time, the notification message may provide information (e.g., join, join open chatting) on the progress stage according to a function implemented in the board 500. For example, when the function set on the board 500 is a schedule guide, the notification message may include a "View schedule" button that makes to move to a calendar and to check a detailed screen for the schedule set on the board 500. The message may include a "Join" button that enables to move to a participation link. When the function set on the board 500 includes an open chat, the notification message may include a "Join open chat" button that enables to move to an open chat room.

Figure 14:
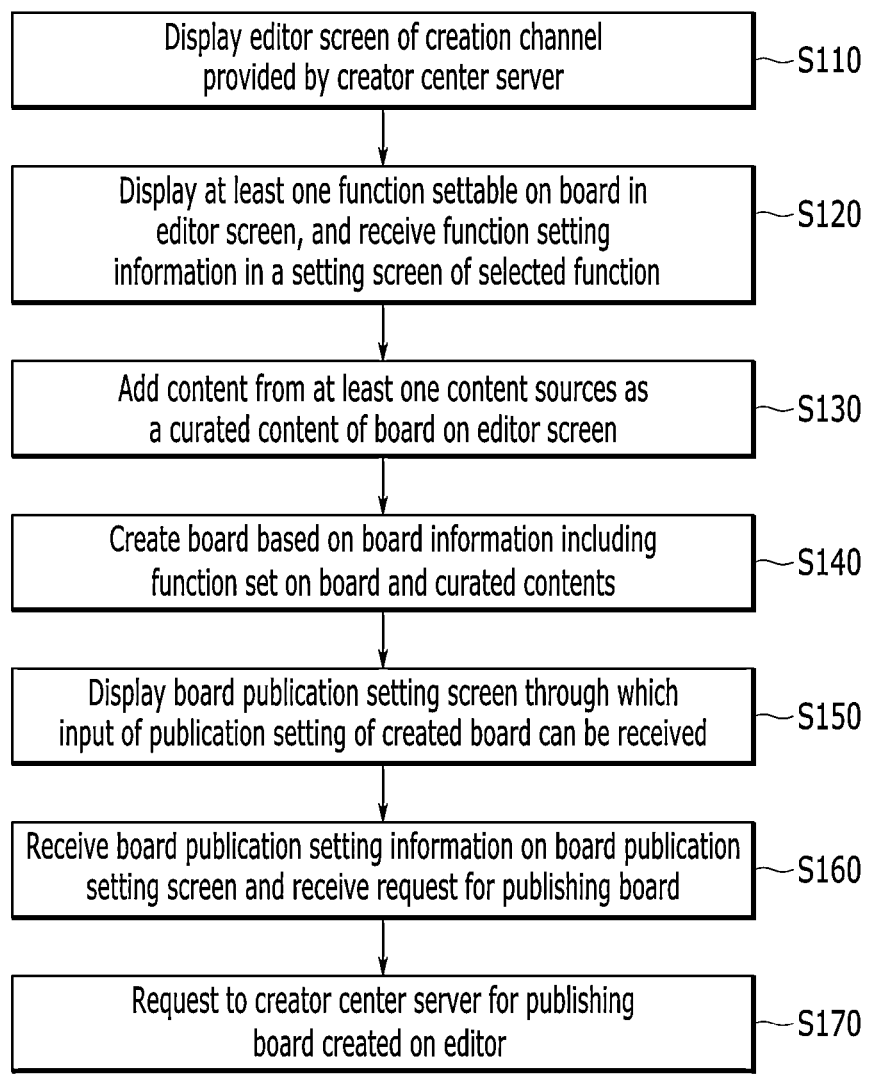
FIG. 14 is a flowchart showing a method for creating a board according to an embodiment.

FIG. 14 is a flowchart showing a method for creating a board according to an embodiment.

Referring to FIG. 14, a creator terminal 300 accesses a creator center server 100 and then displays an editor screen provided by the creator center server 100 (S110). The editor screen includes inputtable areas that can create a board to be published in a creation channel A board creation area that can receive information on areas constituting the board may display a name of a channel being a publishing entity, and may display the inputtable areas, such as a board title area, a board description area, a board function area, and a content area.

The creator terminal 300 displays at least one function settable on the board in the editor screen, and receives at least one of function setting information in a setting screen of a selected function (S120). The settable functions on the board may include, for example, an open chat function, a schedule-related calendar function, a purchase function, a sponsorship function, and the like. The function set on the board is implemented as an action button displayed on a predetermined area of the board, and a button name of the action button may be changed with the passage of time and a selection of a user. The function setting information is determined according to the selected function. A function setting screen displays an input means through which information to be displayed on an interaction area of the board can be received. When the open chat function is selected, a chat room name related to the open chat, a chat room introduction, an activation time point and an activation period of the open chat may be received. When the schedule-related calendar function is selected, a schedule name (schedule title), and start time and end time of the schedule may be input. Additional schedule-related information, such as a schedule description, a participation link, and a place, may be input. By inputting the participation link, a creator can set so that some participants can join an online meeting through the participation link (URL). By inputting a place for the schedule, a participant enables some participants of the schedule to join an offline meeting at the place.

The creator terminal 300 adds a content from at least one content sources as a curated content of the board on the editor screen (S130). The creator terminal 300 may display interworking services, being the content sources, on the editor screen, and add a content selected by the creator in the interworking services as the curated content of the board. In addition, the creator terminal 300 may display an input window for inputting an address link (URL), and may add a content corresponding to the address link as a content of the board. Further, the creator terminal 300 may display published boards and add a content selected by the creator from the published boards as the content of the board.

The creator terminal 300 creates the board based on board information including a function set on the board and curated contents (S140). The board information may be a board title, a board description, a function set on the board, and the curated contents.

The creator terminal 300 displays a board publication setting screen through which an input of publication setting of a created board can be received (S150). The board publication setting screen may display a screen for inputting publication settings, such as a disclosure setting of a board, a publication time point (present or scheduled), a category of the board, and whether to expose a board guidance message for reward.

The creator terminal 300 receives the board publication setting information on the board publication setting screen and receives a request for publishing a board (S160).

The creator terminal 300 requests for publishing a board of a creation channel that is created in the editor screen to the creator center server 100 (S170). The board created by the creator terminal 300 may be published with being assigned a board identifier by the creator center server 100.

Thereafter, the creator terminal 300 may check the boards published in the creation channel, may update the board by modifying and editing, or may delete the board.

Figure 15:
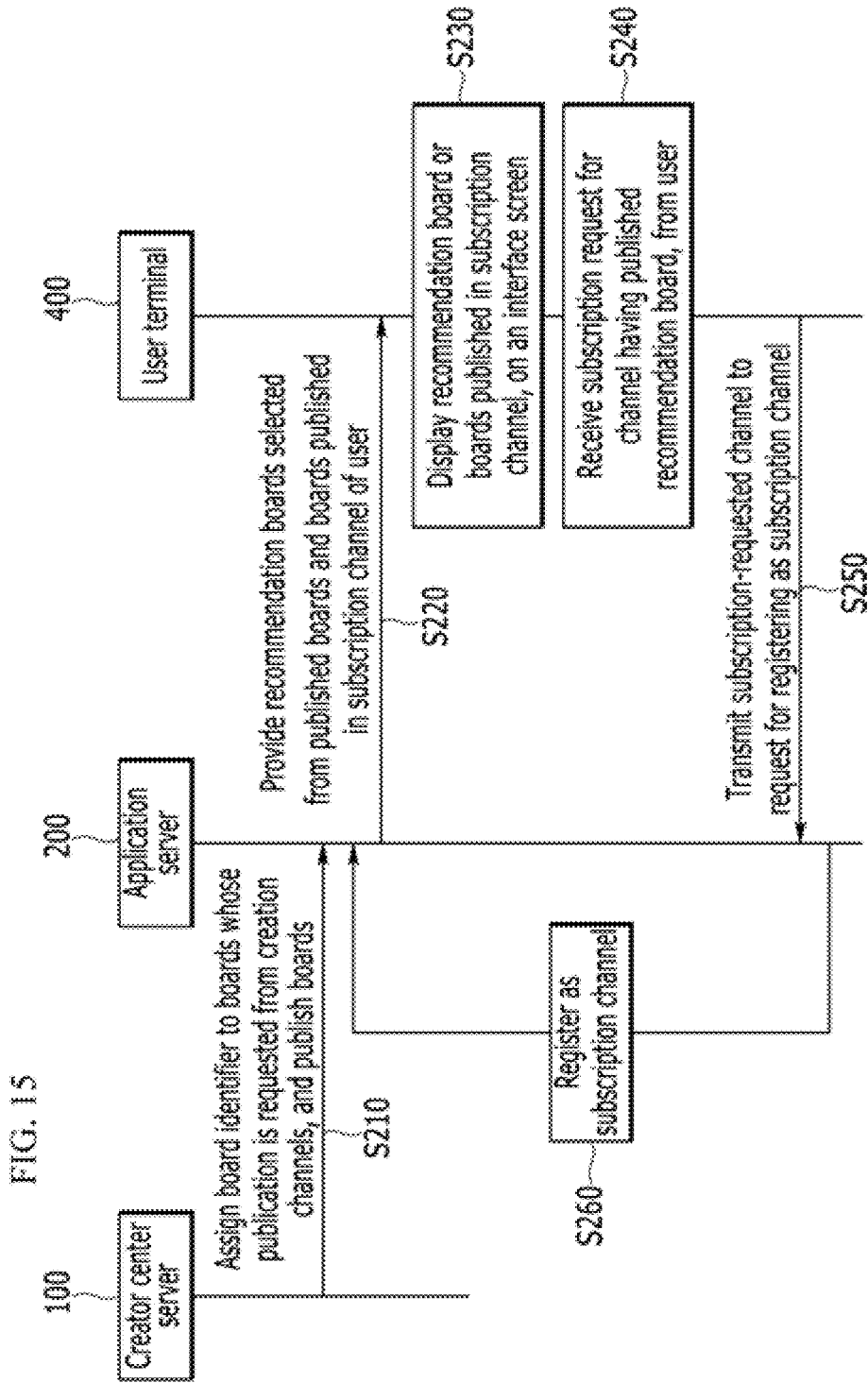
FIG. 15 is a flowchart showing a method for providing a subscription service according to an embodiment.

FIG. 15 is a flowchart showing a method for providing a subscription service according to an embodiment.

Referring to FIG. 15, a creator center server 100 assigns a board identifier to boards whose publication is requested from creation channels and publishes the boards (S210).

An application server 200 provides a user terminal 400 with recommendation boards selected from the boards published in the creator center server 100 and the boards published in a subscription channel of the user (S220). The application server 200 may provide the user terminal 400 with a data board composed of contents collected and edited by an algorithm in addition to a created board composed of contents curated by a creator.

The user terminal 400 displays the recommendation boards provided by the application server 200 or boards published in the subscription channel, on an interface screen (S230). The user terminal 400 may display a screen including a discovery tab exposing recommendation boards and a subscription tab exposing boards recently published in the subscription channel. The user terminal 400 may provide a discovery tab screen that may be composed of sub-tabs, such as a search tab, a today tab, a multimedia tab (e.g., Kakao TV), and a timeliness tab (e.g., COVID-19). The user terminal 400 may display a board recently published in the subscription channel on one slot of the subscription tab screen. The user terminal 400 can display various types of boards. For example, a created board including contents curated by the creator, and the data board collected and edited by the algorithm may be exposed.

The user terminal 400 receives a subscription request for a channel that has published a recommendation board, from the user (S240). A user can request a subscription in a way of adding the channel as a friend.

The user terminal 400 transmits information on the subscription-requested channel to the application server 200 to request for registering as a subscription channel of the user (S250).

The application server 200 registers the channel for which a subscription is requested by the user terminal 400, as the subscription channel of the user (S260).

Thereafter, the user terminal 400 may expose the recent board of the corresponding channel on a slot of a new subscription channel.

Figure 16:
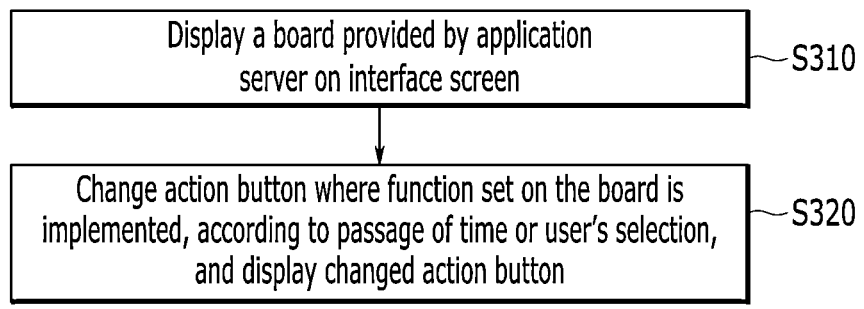
FIG. 16 is a flowchart showing a method for providing a function on a board according to an embodiment.

FIG. 16 is a flowchart showing a method for providing a function on a board according to an embodiment.

Referring to FIG. 16, a user terminal 400 displays a board provided by an application server 200 on an interface screen (S310). The board may include a name of a creation channel, a board title, a board description, a time point of board publication, and contents, and may include an interaction area including an action button in which a function is implemented. The interaction area may display an action button providing a function, a function description, and a function state. The action button can be selected (e.g., clicked). A button name (e.g., receive notification, open chat, join, purchase, etc.) of the action button may be displayed.

The user terminal 400 changes the action button where a function set on the board is implemented, according to the passage of time or a selection of a user, and displays the changed action button (S320).

If the function set on the board is an open chat function, before the set open chat starts, an action button of "Receive notification" and a state of an open chat (e.g., 5 days left) may be displayed. When the open chat starts, an action button of "Open chat" and the state of the open chat (e.g., in conversation, number of participants, etc.) may be displayed. When the open chat ends, the interaction area including the action button may be deleted from the board, and become not to be exposed on the board.

If the function set for the board is a schedule-related calendar function, before it becomes a start time of a schedule, the action button of "Receive notification" and remaining time (e.g., 5 days left) may be displayed. When the schedule starts, the action button is changed to a button name corresponding to a state after starting the schedule. If a participation link is not input for the schedule, an action button of "View schedule" and a schedule state (e.g., in progress) may be displayed. If the participation link is input for the schedule, an action button of "Join" and a schedule state (e.g., joinable, in progress) may be displayed. When the schedule ends, an action button of "View schedule" and a function state changed as terminated state may be displayed. According to the setting, after the schedule ends, the interaction area may be deleted from the board, and becomes not to be exposed on the board.

Meanwhile, when the user selects the action button of "Receive notification" on a published board, the action button may be displayed with a changed name of "In receiving notification".

As described above, according to an embodiment, any user who has a channel in an application can become a creator. Further, through boards curated with various perspectives of creators, an activation of subscription, a continuous maintenance of subscription, and an increase in content consumption can be expected.

According to an embodiment, through an editor provided by a creator center server, a creator can interwork with various content sources, can load a board being a content distribution unit by curating contents fetched from the interworking service and contents fetched by inputting an address link, and can publish the board to expose the board to a subscriber/potential subscriber.

According to an embodiment, a user can search for recommendation boards, and can search for recently published boards in a subscription channel added as a friend.

According to an embodiment, it is possible to expose contents as a board unit consisting of contents grouped by one topic (board title), and to enable a content curated by a creator to be completely consumed.

According to an embodiment, by providing interactions between creators and users via a board including functions, it can be deviated from providing a content unilaterally and interests can be continuously shared even after content consumption.

According to an embodiment, a board can be utilized as a micro-platform for various purposes based on a function set by a creator.

The embodiment of the present disclosure described above is not implemented only through the device and method, and a program for realizing a function corresponding to the configuration of the embodiment of the present disclosure or the program may be implemented through a recording medium in which the program is recorded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for providing a subscription service by a terminal installed with an instant messaging application, through interworking with an application server, the method comprising:
    displaying a board provided by the application server on an interface screen; and
    changing an action button in which a function set on the board is implemented according to a passage of time and displaying the changed action button,
    wherein the board comprises a board title, a plurality of contents curated for publishing, and the action button, and is exposed along with a name of a channel publishing the board,
    wherein the channel publishing the board is an account that has subscribed to a service providing the instant messaging application, and
    wherein changing the action button and displaying the changed action button comprises, when the function set on the board is an open chat function activated at a scheduled time point, changing from an action button of receiving a notification that is available for receiving a notification of the open chat, to an action button of open chat that is available for entering an open chat room, over time.

2. The method of claim 1, wherein changing the action button and displaying the changed action button comprises displaying a board in which an interaction area including the action button is deleted after the open chat is terminated.

3. A method for providing a subscription service by a terminal installed with an instant messaging application, through interworking with an application server, the method comprising:
    displaying a board provided by the application server on an interface screen; and
    changing an action button in which a function set on the board is implemented according to a passage of time and displaying the changed action button,
    wherein the board comprises a board title, a plurality of contents curated for publishing, and the action button, and is exposed along with a name of a channel publishing the board,
    wherein the channel publishing the board is an account that has subscribed to a service providing the instant messaging application,
    wherein changing the action button and displaying the changed action button comprises, when the function set on the board is a schedule-related calendar function starting at a scheduled time point, changing from an action button of receiving a notification that is available for receiving a notification of the schedule, to an action button corresponding to a state after starting the schedule, over time, and wherein the action button corresponding to the state after starting the schedule comprises an action button for viewing a schedule, an action button for joining with a participation link set on the function, or an action button of an open chat that is available for entering an open chat room set for the function.

4. The method of claim 1, wherein changing the action button comprises changing the action button in which the first function set on the board is implemented according to the passage of time without a selection of a user.

5. The method of claim 1, further comprising adding the channel publishing the board as a friend in the instant messaging application, wherein displaying the board provided by the application server comprises displaying the board published in the channel added as the friend.

6. The method of claim 1, further comprising changing the action button in which the function set on the board is implemented according to a selection of a user.

7. The method of claim 6, wherein changing the action button in which the function set on the board is implemented according to the selection of the user comprises changing an action button of receiving a notification to an action button of being in receiving the notification, when a user selects the action button of receiving a notification that enables to receive a notification of the function set on the board.

8. The method of claim 7, further comprising:
receiving a request for receiving a notification about the function of the board through a selection of the action button of receiving a notification; and
receiving a notification message related to the function from the application server.

* * * * *